United States Patent Office 3,415,855
Patented Dec. 10, 1968

3,415,855
TRICHLORO PREGNADIENES AND ESTERS THEREOF
Elliot L. Shapiro, Cedar Grove, and Emanuel B. Hershberg, West Orange, N.J., assignors to Schering Corporation, Bloomfield, N.J., a corporation of New Jersey
No Drawing. Filed May 27, 1966, Ser. No. 566,699
9 Claims. (Cl. 260—397.45)

ABSTRACT OF THE DISCLOSURE

This invention relates to $9\alpha,11\beta,16\alpha$-trichloro-1,4-pregnadiene-$17\alpha,21$-diol-3,20-dione, to C-17 and/or C-21 esters thereof and to methods for preparing the same; said compounds being useful as anti-inflammatory agents.

---

This invention relates to new compositions of matter classifiable in the field of steroid chemistry as $16\alpha$-chloro-9,11-dihalo corticoids and the esters thereof, and to the use of these compositions in the application of anti-inflammatory therapy.

In one of its composition aspects the instant invention may be described as residing in the concept of a steroid compound having the molecular structure of a $9\alpha,11\beta,16\alpha$-trichloro-1,4-pregnadiene-$17\alpha,21$-diol-3,20-dione and to the 17-lower alkanoyl esters thereof and the 21-pharmaceutically acceptable esters thereof and the $17\alpha,21$-diesters thereof.

In another of its composition aspects the instant invention may be described as residing in the concept of a pharmaceutical formulation containing as an essential active ingredient a tangible embodiment as described above.

The instant invention is based upon the discovery that the tangible embodiments disclosed herein elicit a potent anti-inflammatory effect as determined by standard pharmacological evaluation. This effect is especially pronounced when the tangible embodiments are administered via the topical route.

The novel compounds of the instant invention in one sense may be represented as a member of the group consisting of 1,4-pregnadienes having the following structural formula:

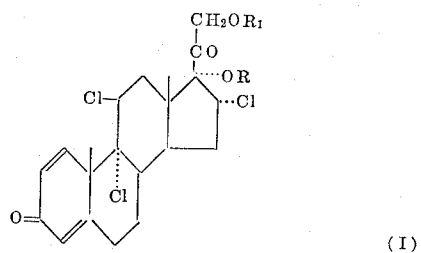

(I)

wherein R is hydrogen or lower alkanoyl and $R_1$ is hydrogen, phosphono, sulfo, hydrocarbon carbonyl having up to 12 carbon atoms and carboxysubstituted-hydrocarbon carbonyl having up to 12 carbon atoms.

As used herein the term "lower alkanoyl" denotes acyl groups of alkanoic acids having up to 5 carbon atoms including straight and branched chain acids.

Similarly, the term hydrocarbon carbonyl denotes acyl groups of hydrocarbon carboxylic acids and, as used herein, those groups derived from such acids having up to 12 carbon atoms. Exemplary of the foregoing are such acids as acetic, propionic, pivalic, valeric, cyclopropylcarboxylic, adamantoic, benzoic, phenylacetic and the like. The term carboxysubstituted-hydrocarbon carbonyl denotes hemi-acyl groups derived from dibasic hydrocarbon carboxylic acids of up to 12 carbon atoms such as result from the esterification of a steroidal C-21 hydroxyl group with such acids as succinic, malonic, maleic, malic, glutaric, adipic and the like; maleic and succinic being preferred.

As used herein the terms "phosphono" and "sulfo" denote the monovalent

and the monovalent

groups respectively.

The tangible embodiments of this invention may be prepared from $16\alpha$-chloro-1,4-pregnadiene-$11\beta,17\alpha,21$-triol-3,20-dione 21-acetate, which upon dehydration via known methods is transformed into $16\alpha$-chloro-1,4,9,(11)-pregnatriene-$17\alpha,21$-diol-3,20-dione 21-acetate. Chlorination of the 9,11-double bond by known techniques yields a tangible embodiment of Formula I in the form of its 21-acetate. This compound may optionally be hydrolyzed by treatment with aqueous acid in a water miscible organic solvent or saponified with aqueous alkali. Aqueous perchloric acid in methanol is preferred to perform this transformation yielding the free 21-hydroxy analog.

The $17\alpha,21$-di-ester embodiments of this invention wherein the ester groups are derived from the same acid function are readily obtained by known esterification techniques from the corresponding $17\alpha,21$-diol. The $17\alpha,21$-dipropionate of $9\alpha,11\beta,16\alpha$-trichloro-1,4-pregnadiene-$17\alpha,21$-diol-3,20-dione may be prepared, for example, by treating the diol with a mixture of trifluoroacetic anhydride and propionic acid at about 80° C. for about 1 to about 2 hours followed by precipitation to yield the $17\alpha,21$-dipropionate.

The di-esters of the instant invention wherein the ester groups at the $17\alpha$ and 21 positions are dissimilar, are also readily prepared by conventional esterification techniques. By starting with the trichloro-$17\alpha,21$-diol embodiment and esterifying at the 21 position with a lower alkanoyl chloride or anhydride in a tertiary amine, the 21-mono ester is obtained. The ester function at position 17 may be formed by reacting the 21-mono-ester with either a lower alkanoic acid in combination with trifluoroacetic anhydride or with a mixture of a lower alkanoic acid and its anhydride in the presence of a strong acid catalyst such as p-toluene sulfonic acid or mineral acid as represented by perchloric or sulfuric acid.

Alternatively, both 17-monoesters and 17,21-diesters (having similar or dissimilar acyl moieties) may be prepared through a 17,21-orthoester intermediate. In this method the $9\alpha,11\beta,16\alpha$-trichloro-1,4-pregnadiene-$17\alpha,21$-diol-3,20-dione is treated with a lower alkyl ester of an orthocarboxylic acid, such as methyl orthobutyrate, in the presence of a strong acid catalyst to form the corresponding 17,21-orthoester which upon mild acid hydrolysis is converted to the corresponding 17-monoester. Introduction of an ester function at C-21, which may either be the same as or different from the ester function at C-17, is readily accomplished by methods previously described.

It is to be understood that in the examples appearing hereinafter that in these examples disclosing the preparation of 21-hemisuccinate embodiments the products obtained are not washed free of acid, since the embodiment itself contains a free carboxylic acid group.

The best mode contemplated by applicant for carrying out this invention is set forth in the following examples.

Example 1.—9α,11β,16α-trichloro-1,4-pregnadiene - 17α, 21-diol-3,20-dione 21-acetate (A) Dissolve 711 mg. of 16α-chloro-1,4-pregnadiene-11β,17α,21-triol - 3,20 - dione 21 - acetate (16α - chloro-prednisolone 21-acetate) and 338 mg. N-bromacetamide in 7.1 ml. pyridine. Maintain this solution at room temperature for 10 minutes. Cool this solution to 5° and bubble sulfur dioxide into it until the solution becomes very dark. This usually takes approximately 5 minutes. Discontinue the sulfur dioxide addition and allow the reaction mixture to stand at 5° for approximately 10 minutes. Precipitate the crude product by adding water and extract the precipitate with methylene chloride. Wash the methylene chloride extract with dilute hydrochloric acid, then with water until the washes are neutral and dry the extract over anhydrous magnesium sulfate. Filter the suspension and evaporate the filtrate to a residue. Triturate the residue with ether and collect the insolubles. Crystallize the insolubles from ethyl acetate to obtain 564 mg. of 16α-chloro-1,4,9(11)-pregnatriene-17α,21-diol - 3,20-dione 21-acetate. M.P. 225°–228° C., $[\alpha]_D^{25}+4°$ (1% in $CHCl_3$).

(B) Dissolve 430 mg. of the triene obtained above in 40 ml. methylene chloride and 4.5 ml. pyridine. Cool the solution to —50° with stirring. Add very rapidly 0.86 ml. of a solution of chlorine in carbon tetrachloride, said solution having a chlorine titer of 85 mg. per milliliter of solution. Allow the reaction to proceed for 2 hours then raise the temperature of the reaction mixture up to —10° and allow the reaction to continue for an additional 3 hours. Dilute the reaction mixture with methylene chloride to 150 milliliter total volume. Wash the methylene chloride solution with dilute hydrochloric acid and with water until the washes are neutral. Dry the organic solvent layer over anhydrous magnesium sulfate. Remove the inorganic salts by filtration and evaporate the filtrate to a residue. Crystallize the residue from ethyl acetate to obtain 315 mg. of the compound of this example.

Example 2.—9α,11β,16α-trichloro-1,4-pregnadiene - 17α, 21-diol-3,20-dione

Dissolve 100 mg. of the product of Example 1 in 7.0 ml. methyl alcohol and 0.18 ml. 70% perchloric acid. Allow the reaction mixture to remain at room temperature for 18 hours. Add salt water to the solution and extract with methylene chloride. Wash the methylene chloride extract with a 5% solution of sodium carbonate solution and with water. Evaporate the organic layer to a residue and crystallize the residue from acetone-hexane to yield 9α,11β,16α-trichloro-1,4-pregnadiene-17α,21 - diol - 3,20-dione.

Example 3.—9α,11β,16α-trichloro-1,4-pregnadiene - 17α, 21-diol-3,20-dione 17-propionate Treat 5 g. of 9α,11β,16α-trichloro-1,4-pregnadiene-17α, 21-diol-3,20-dione in 500 ml. of benzene with 3.0 ml. of trimethylorthopropionate and 140 mg. of para-toluenesulfonic acid monohydrate at reflux ½ hour. Cool the solution to room temperature and add 5.0 g. of sodium bicarbonate and 5.0 ml. of triethylamine. Stir the mixture for five minutes and filter. Concentrate the filtrate to a residue and dissolve the residue with external cooling in 50 ml. of 95% acetic acid 5% water mixture. Stir the mixture at room temperature for 15–20 hours. Precipitate the product by dilution with 10 volumes of water. Collect the product by filtration and water wash the precipitate free of acid. Purify the crude product by crystallization from acetone obtaining the 17-propionate of this example.

In like manner, by employing other lower alkyl orthocarboxylic acid esters in the process of this example, additional 17-esters are prepared such as the acetate from methylorthoacetate; the butyrate from methyl or ethyl orthobutyrate, and the valerate from a lower alkyl orthovalerate.

Example 4.—9α,11β,16α-trichloro-1,4-pregnadiene - 17α, 21-diol-3,20-dione 17-propionate 21-valerate Dissolve 1 g. of 9α,11β,16α-trichloro-1,4-pregnadiene-17α,21-diol-3,20-dione 17α-propionate in 5 ml. of dry pyridine and 1 ml. of valeric anhydride. Allow the reaction mixture to remain at room temperature for 18 hours. Precipitate the product by pouring the reaction mixture slowly into 50 ml. of vigorously stirred ice water solution containing 6 ml. of concentrated hydrochloric acid. Collect the product by filtration and wash it free of excess acid. The mixed diester product of this example is purified by crystallization from acetone-hexane.

In like manner, by employing appropriate acid anhydrides or acid chlorides in the process of this example and using the 17α-esters as prepared in Example 3, 17-21-diesters of which the following are exemplary are prepared:

9α,11β,16α-trichloro-1,4-pregnadiene-17α,21-diol-3,20-dione 17,21-diacetate

9α,11β,16α-trichloro-1,4-pregnadiene-17α,21-diol-3,20-dione 17-acetate 21-propionate 9α,11β,16α-trichloro-1,4-pregnadiene-17α,21-diol-3,20-dione 17-acetate 21-butyrate 9α,11β,16α-trichloro-1,4-pregnadiene-17α,21-diol-3,20-dione 17-acetate 21-valerate 9α,11β,16α-trichloro-1,4-pregnadiene-17α,21-diol-3,20-dione 17α-acetate 21-enanthate 9α,11β,16α-trichloro-1,4-pregnadiene-17α,21-diol-3,20-dione 17-acetate 21-hemisuccinate 9α,11β,16α-trichloro-1,4-pregnadiene-17α,21-diol-3,20-dione 17-acetate 21-cyclopropylcarboxylate 9α,11β,16α-trichloro-1,4-pregnadiene-17α,21-diol-3,20-dione 17-propionate 21-acetate 9α,11β,16α-trichloro-1,4-pregnadiene-17α,21-diol-3,20-dione 17,21-dipropionate 9α,11β,16α-trichloro-1,4-pregnadiene-17α,21-diol-3,20-dione 17-butyrate 21-propionate 9α,11β,16α-trichloro-1,4-pregnadiene-17α,21-diol-3,20-dione 17-propionate 21-butyrate 9α,11β,16α-trichloro-1,4-pregnadiene-17α,21-diol-3,20-dione 17-propionate 21-valerate 9α,11β,16α-trichloro-1,4-pregnadiene-17α,21-diol-3,20-dione 17-propionate 21-enanthate 9α,11β,16α-trichloho-1,4-pregnadiene-17α,21-diol-3,20-dione 17-propionate 21-cyclopropylcarboxylate 9α,11β,16α-trichloro-1,4-pregnadiene-17α,21-diol-3,20-dione 17-propionate 21-hexanoate 9α,11β,16α-trichloro-1,4-pregnadiene-17α,21-diol-3,20-dione 17-butyrate 21-acetate 9α,11β,16α-trichloro-1,4-pregnadiene-17α,21-diol-3,20-dione 17,21-dibutyrate 9α,11β,16α-trichloro-1,4-pregnadiene-17α,21-diol-3,20-dione 17-butyrate 21-valerate 9α,11β,16α-trichloro-1,4-pregnadiene-17α,21-diol-3,20-dione 17-valerate 21-acetate 9α,11β,16α-trichloro-1,4-pregnadiene-17α,21-diol-3,20-dione 17-valerate 21-propionate 9α,11β,16α-trichloro-1,4-pregnadiene-17α,21-diol-3,20-dione 17,21-divalerate

Example 5.—9α,11β,16α-trichloro-1,4-pregnadiene-17α, 21-diol-3,20-dione 17,21-dibutyrate Suspend 10 g. of 9α,11β,16α-trichloro-1,4-pregnadiene 17α,21-diol-3,20-dione in 150 ml. of butyric acid, add 50 ml. of trifluoroacetic anhydride, and warm the mixture on a steam bath to about 80° C. and hold at temperature for 1 hour. Cautiously add 50 ml. of water and allow 10 minutes for the decomposition of the excess anhydride and cool the reaction mixture to room temperature. Pour the acid solution slowly into 2.0 l. of vigorously stirred ice water to precipitate the product. Collect this product on a filter, wash it until the washes are essentially neutral. The product obtained thereby comprises the title compound which may be crystallized from ethyl acetate.

In like manner, by employing the procedure and the starting material of this example and utilizing acetic, propionic, isobutyric or valeric acids in combination with trifluoroacetic anhydride, 17,21-diesters are prepared such as the 17,21-diacetate, 17,21-dipropionate, 17,21-diisobutyrate, 17,21-divalerate, and the like.

Example 6.—9α,11β,16α-trichloro-1,4-pregnadiene-17α,21-diol-3,20-dione 17-valerate 21-acetate Suspend 5 g. of 9α,11β,16α-trichloro-1,4-pregnadiene-17α,21-diol-3,20-dione 21-acetate in 50 ml. of valeric acid. Add 25 ml. of trifluoroacetic anhydride and warm the mixture on a steam bath for 1 hour at 80° C. Cool the mixture to room temperature and add 25 ml. of water. Allow 10 minutes for the decomposition of the excess anhydride and pour the reaction mixture slowly into 1.0 l. of ice water with vigorous agitations. Collect the product by filtration and wash it free of excess acid. The product obtained in this manner comprises the title compound and minor amounts of insoluble impurities which may be removed by crystallization from aqueous methanol.

In like manner, by the appropriate selection of the ester function at 21 of the starting material and the requisite carboxylic acid in combination with trifluoro acetic anhydride and by using the process of this example, diesters may be prepared of which the following are exemplary:

9α,11β,16α-trichloro-1,4-pregnadiene-17α,21-diol-3,20-dione 17-butyrate 21-propionate
9α,11β,16α-trichloro-1,4-pregnadiene-17α,21-diol-3,20-dione 17-butyrate 21-valerate
9α,11β,16α-trichloro-1,4-pregnadiene-17α,21-diol-3,20-dione 17-valerate 21-propionate
9α,11β,16α-trichloro-1,4-pregnadiene-17α,21-diol-3,20-dione 17-acetate 21-valerate
9α,11β,16α-trichloro-1,4-pregnadiene-17α,21-diol-3,20-dione 17-acetate 21-butyrate
9α,11β,16α-trichloro-1,4-pregnadiene-17α,21-diol-3,20-dione 17-propionate 21-acetate
9α,11β,16α-trichloro-1,4-pregnadiene-17α,21-diol-3,20-dione 17,21-dipropionate
9α,11β,16α-trichloro-1,4-pregnadiene-17α,21-diol-3,20-dione 17-valerate 21-hemissucinate
9α,11β,16α-trichloro-1,4-pregnadiene-17α,21-diol-3,20-dione 17-valerate 21-cyclopropylcarboxylate Example 7.—9α,11β,16α-trichloro-1,4-pregnadiene-17α,21-diol 3,20-dione 21-adamantoate Dissolve 10 g. of adamantane carboxylic acid in 4 ml. of trifluoroacetic anhydride. Add to this solution 1 gm. of 9α,11β,16α - trichloro - 1,4-pregnadiene-17α,21-diol-3,20-dione prepared as in Example 2. Stir the resulting solution at 25° C. for 1 hour and precipitate by pouring slowly into 40 ml. of water. Collect the precipitate on a filter and water wash. Dry the product and slurry the dry solids in 100 ml. of hexane for 1 hour. Filter the suspension, re-slurry the solids in 50 ml. of fresh hexane for 1 hour and re-filter the suspension. Crystallize the remaining solids from acetone-hexane to obtain 9α,11β,16α-trichloro-1,4-pregnadiene-17α,21-diol-3,20-dione 21-adamantoate.

The tangible embodiments of this invention elicit a potent anti-inflammatory effect in animals and humans as determined by standard pharmacological testing techniques. They are of particular use when applied topically. The topical utility of a 17α,21-diol, such as a member of the tangible embodiments described herein is particularly surprising, for such alcohols generally are relatively inactive via this route of application.

The tangible embodiments of this invention may be applied topically in the form of ointments, lotions and creams and aerosol sprays. These formulations may also contain perfumes and be colored with appropriate tints to approximate skin color.

Desirably these formulations are compounded so as to contain from about .05% to about 1.0% by weight of steroid, 0.1% to 0.3% by weight being especially preferred.

The effective dosage of the tangible embodiments described herein depends upon the severity, the stage and the individual characteristics of each case and should be determined by a physician or a veterinarian. In general, however, the compounds of the instant invention may be applied topically from 1 to about 4 times a day.

Where a systemic effect is to be elicited, the tangible embodiments may also be administered in the form of tablets, capsules, elixirs and injectable suspensions or solutions. These dosage forms may, additionally, contain anti-anxiety medicaments to minimize the anxieties often coincident with an inflammatory condition.

The following formulations are for illustrative purposes only and are not to be construed as in any way limiting this invention.

Aerosol formulation 50 gram container .3% steroid does:
  9α,11β,16α - trichloro-1,4-pregnadiene-17α,21-diol-3,20-dione 21-acetate _____ mg__ 6.0
  Isopropyl myristate _____ gms__ 1.994
  Freon 11 (35%) Freon 12 (65%) q.s. to .50.0 gms.

Add to the isopropyl myristate, in a suitable container, the previously micronized steroid and mix by gentle rotary agitation. Premix the freon propellants in the indicated ratio and add to the product mix in the container to a net weight of 50 g.

Vanishing cream

|  | Parts |
|---|---|
| 9α,11β,16α - trichloro-1,4-pregnadiene 17α,21-diol-3,20-dione 21-adamantoate | 2.5 |
| Stearic acid | 100 |
| Span 60 | 50 |
| Span 80 | 10 |
| Tween 30 | 30 |
| Methyl paraben USP | 1.0 |
| Butyl paraben USP | 4.0 |
| Distilled water q.s. to 1000 parts. | |

Charge all of the ingredients except the water and the steroid to a suitably sized stainless steel blending vessel and heat with agitation to 75° C. Micronize the steroid ingredient and slurry with 50 parts of distilled water until the solids are uniformly dispersed. Cool the blended mix to 40° C. and add the steroid slurry. Rinse the mill with distilled water and add the rinse to the formulation. Add the required remainder of water and cool to room temperature with stirring. Package in suitable containers.

Tablet—5 mg.

| | |
|---|---|
| 9α,11β,16α - trichloro-1,4-pregnadiene 17α,21-diol-3,20-dione 17-valerate 21-acetate | 5.0 |
| Starch, food | 5.0 |
| Lactose (spray dried), USP | 89.5 |
| Magnesium stearate | 0.5 |
| | 100.0 |

Mix the starch and the steroid, the latter having been previously milled in a suitable mixing vessel, and add an equal weight of lactose. Blend until uniform and then transfer to a larger mixing vessel containing the remainder of the lactose. Blend the mixture until homogeneous. Remove a portion (10–20 mg.) and blend with the magnesium stearate. Add the magnesium stearate mix to the balance of the steroid blend prepared above and compress to desired specifications.

Capsule—5 mg.

| | Mg./capsule |
|---|---|
| 9α,11β - 16α-trichloro-1,4-pregnadiene-17α,21-diol-3,20-dione 17-butyrate | 5.0 |
| Lactose (spray dried), USP | 194.5 |
| Magnesium stearate, USP | 0.5 |
| | 200.0 |

The steroid is milled to a uniform, fine particle size (150–200 mesh) and mixed with approximately 1% of the lactose in a suitable mixing container. This premix is added to the remainder of the lactose in a larger blending vessel, blended until uniform and used to fill hard shell slip capsules.

It is to be understood that the foregoing formulations have been presented for the purpose of illustration and that other tangible embodiments of this invention would be utile in the formulations presented. It should be further understood that in the various pharmaceutical compositions presented herein the concentration of the active ingredient will be such that an amount of composition which can be conveniently administered during each treatment will contain a sufficient quantity of such active ingredient which will elicit an appropriate and proper therapeutic response.

We claim:

1. A compound selected from the group consisting of 1,4-pregnadienes having the following structural formula:

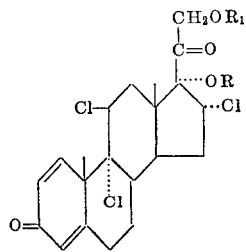

wherein R is a member selected from the group consisting of hydrogen and lower alkanoyl, and $R_1$ is a member selected from the group consisting of hydrogen, phosphono, sulfo, hydrocarbon carbonyl, and carboxysubstituted-hydrocarbon carbonyl, said hydrocarbon carbonyl groups having up to 12 carbon atoms.

2. A compound of claim 1 wherein R is lower alkanoyl and $R_1$ is hydrogen.

3. A compound of claim 1 wherein R is hydrogen and $R_1$ is adamantoyl, said compound being 9α,11β,16α-trichloro - 1,4 - pregnadiene-17α,21-diol-3,20-dione 21-adamantoate.

4. A compound of claim 1 wherein R is propionyl and $R_1$ is propionyl, said compound being 9α,11β,16α-trichloro - 1,4 - pregnadiene - 17α,21-diol-3,20-dione 17,21-dipropionate.

5. A compound of claim 1 wherein R is butyrate and $R_1$ is butyrate, said compound being 9α,11β,16α-trichloro-1,4-pregnadiene-17α,21-diol-3,20-dione 17,21-dibutyrate.

6. A compound of claim 1 wherein R is propionyl and $R_1$ is hydrogen, said compound being 9α,11β,16α-trichloro - 1,4 - pregnadiene - 17α,21 - diol-3,20-dione 17-propionate.

7. A compound of claim 1 wherein R is butyryl and $R_1$ is hydrogen, said compound being 9α,11β,16α-trichloro-1,4-pregnadiene-17α,21-diol-3,20-dione 17-butyrate.

8. A compound of claim 1 wherein R is valeryl and $R_1$ is hydrogen, said compound being 9α,11β,16α-trichloro-1,4-pregnadiene-17α,21-diol-3,20-dione 17-valerate.

9. A compound of claim 1 wherein R and $R_1$ are hydrogen, said compound being 9α,11β,16α-trichloro-1,4-pregnadiene-17α,21-diol-3,20-dione.

No references cited.

ELBERT L. ROBERTS, *Primary Examiner.*

U.S. Cl. X.R.

167—65